Patented Mar. 6, 1934

1,949,644

UNITED STATES PATENT OFFICE 1,949,644

FILTERING METHOD AND MATERIAL

Victor C. Benjamin, Los Angeles, Calif.

No Drawing. Application May 10, 1932,
Serial No. 610,500

3 Claims. (Cl. 210—205)

In an application filed by me on May 25, 1931, under Serial No. 540,011, entitled Filtering material and method, I have disclosed the preparation and use of a cake or plate adapted to the filtration of oleaginous or nonaqueous liquids, this cake being formed by finely grinding certain clays or clay-like materials, forming them into a paste with water, casting this paste into a desired shape and allowing substantially all of the water to evaporate. A water-soluble binding material may be used if the clay or clay-like material has insufficient self-cementing properties.

The filter cake thus produced has certain very desirable properties. Its principal advantages are: a relatively high flow rate coupled with a fineness of texture which enables it to retain on its immediate surface gummy or mucilaginous bodies such as fatty oil foots and the finest possible sediments, even such as approach colloidal consistency; a hardness and consistency such that an accumulation of sediment may be removed and the cake returned to its original condition as a free filtering agent by shaving away a very thin superficial layer from the side of the cake on which the sediment is deposited. The disadvantages of this material are, first, that it is relatively fragile and, second, that it is incompatible with water, which reduces it to an incoherent pulp, and therefore cannot be used for the filtration of any aqueous liquids.

I have discovered that by the substitution for the clay-like material of the first application a material known commercially as "rice ash" I am enabled to add a binding material such as Portland or hydraulic cement or plaster of Paris and thus obtain a cake which has all the desirable properties above referred to and in addition can be used for the filtration of aqueous liquids and can be made of sufficient strength to withstand considerable abuse in transportation and handling without rendering it sufficiently hard to interfere with the above described shaving operation.

The rice ash here referred to is the ash produced by the burning of rice hulls, which are produced in considerable quantities at the rice mills in California, Texas, and probably other States. These hulls are burned to reduce them to a small compass and the ash is usually substantially a waste product, having no commercial application of which I am aware. The ash from these hulls is characterized by a considerable degree of hardness, as referred to the individual ash grain, and while the ash as produced is sometimes loosely cemented, a very slight degree of attrition is sufficient to reduce the ash to its ultimate particles without crushing these particles.

The disintegrated mass of ash has an extremely high degree of porosity, considerably exceeding that of diatomaceous earth. The structure somewhat resembles earths of this class but is much coarser, and while I have repeatedly attempted to use diatomaceous or infusorial earth in the preparation of the cakes herein described, I have been unable to produce therewith a cake having the sufficiently high flow rate to be of commercial value. I therefore consider that diatomaceous and infusorial earths are not the equivalent of rice ash in the carrying out of my invention, and I expressly disclaim such earths.

In making my improved filtering material I proceed in the simplest possible manner by mixing with the rice ash a quantity of cement equal to from 30% to 70% by weight of the dry mix. The proper proportion of cement must be governed by the character of the material to be filtered. An increase in the proportion of cement renders the cake harder but reduces its flow rate, for which reason a cake destined to the filtration of highly viscous liquids may use the smaller proportion of cement. Per contra, the flow rate may be increased by using coarser particles or grains of ash. A cake intended for use in the filtration of alcohol, gasoline, or dilute aqueous solutions may require the larger proportion of cement to give it sufficient strength and to increase its density and resistance to flow.

After a very thorough blending of the two dry materials I add sufficient water to form a rather thick cream, which is poured into molds of any suitable size and shape and allowed to set. Even where a quick-setting cement is used, the quality of the cakes is much improved by aging, and I prefer to let them stand in the open air at atmospheric temperatures for from fifteen to thirty days. During this time spontaneous evaporation of the water will reduce the moisture content to from ten to fifteen per cent and I have not found any particular advantage in drying them further, except in case they are to be used for the filtration of oil at high temperature and it is desired to entirely exclude moisture from the oil.

After the initial set (say twenty four hours when a quick-setting cement is used) the cakes may be gently oven-dried without any material change in their filtering value, but cakes so produced are less strong than such as are aged.

The proportion of water must be regulated with considerable care. If too much is used and the mass reduced to a thin consistency, there is a decided tendency for the two solid materials to stratify, the cement passing to the bottom of the mold and the value of the cake being thus entirely destroyed. On the other hand, if the mass is too thick to be fluent, it is difficult to get it to level itself in the mold, though this action may be materially aided by gently shaking or tapping the mold.

It is also permissible and in some cases desirable to first make a thin cream of the cement and then stir in the rice ash, using an excess of water; to allow this slurry to settle for a short time and decant the free water; to carefully but thoroughly stir the thickened slurry and, finally, to pour into the mold. This procedure is somewhat more tedious but gives better dispersion of the materials, prevents balling, and eliminates air bubbles.

The cakes may be of any desired shape and thickness, the shape of course depending on the type of filter press in which they are to be used, and the thickness on the length of life desired for the cake. They may be formed in complete cylinders or in segments for placing on a press having a revolving drum, or flat plates may be used in a plate and frame press. Where the cakes are used on a press having a revolving drum which is partially submerged in a bath of liquid to be filtered, any blow-back connection with which the press may have been provided should be removed and the knife or other shaving tool arranged to continuously remove a very thin shaving, say 1/100 of an inch, from the surface of the cake as it revolves. It should not be understood that this amount of cake should be removed at each revolution of the drum; on the contrary, the sediment should be allowed to accumulate until the flow rate has appreciably dimenished and at such time the sediment and the superficial layer of the cake should be removed, thus exposing a clean surface.

A scraper having the same length as the drum and arranged to be brought into action by hand when required, or mechanically at controllable intervals, will suffice for this purpose. I consider it more desirable to mount a relatively narrow shaving tool in such manner as to cause it to travel at a controllable speed across the face of the cake and, when the end of the cake has been reached, to reverse its direction and at the same time to advance into the cake by a small fraction of an inch. By proceeding in this latter manner a narrow band surrounding the cake is being constantly cleaned and reconditioned and the flow rate is kept uniform.

These and equivalent mechanical devices for shaving are well-known and understood and I do not lay claim to any particular manner of removing a thin superficial layer of the cake, my invention residing in the described constitution of the cake itself and in the reconditioning of the cake by shaving away a superficial layer and with it the sediment which has accumulated on the surface.

I claim as my invention:

1. A filtering medium: a coherent and porous, unburned solid body, capable of retaining its solidity when immersed in water, composed of a solidified mixture of unaltered rice ash, a water-setting cement nonreactive with said rice ash, and water.

2. A filtering medium: a coherent and porous, unburned solid body composed of unaltered rice ash and a water-resistant binder, said binder being nonreactive with said rice ash.

3. A filtering medium: a coherent unburned solid body having unaltered rice ash as its porous constituent.

VICTOR C. BENJAMIN.